(12) United States Patent
Chan et al.

(10) Patent No.: US 9,980,427 B2
(45) Date of Patent: May 29, 2018

(54) SYSTEMS AND METHODS FOR SORTING SEEDLINGS FOR PLANTING

(71) Applicant: Elwha LLC, Bellevue, WA (US)

(72) Inventors: Alistair K. Chan, Bainbridge Island, WA (US); Philip A. Eckhoff, Kirkland, WA (US); Roderick A. Hyde, Redmond, WA (US); Muriel Y. Ishikawa, Livermore, CA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 80 days.

(21) Appl. No.: 15/201,728

(22) Filed: Jul. 5, 2016

(65) Prior Publication Data

US 2016/0309644 A1   Oct. 27, 2016

Related U.S. Application Data

(62) Division of application No. 14/223,504, filed on Mar. 24, 2014, now Pat. No. 9,387,987.

(51) Int. Cl.
*A01B 79/02* (2006.01)
*A01C 1/02* (2006.01)
*A01C 11/02* (2006.01)
*A01C 21/00* (2006.01)
*G05B 15/02* (2006.01)
*B65G 1/137* (2006.01)
*A01B 79/00* (2006.01)

(52) U.S. Cl.
CPC ............ *A01C 11/02* (2013.01); *A01B 79/005* (2013.01); *A01B 79/02* (2013.01); *A01C 1/02* (2013.01); *A01C 11/025* (2013.01); *A01C 21/005* (2013.01); *B65G 1/137* (2013.01); *G05B 15/02* (2013.01)

(58) Field of Classification Search
CPC ....... A01B 79/005; A01B 79/00; A01B 79/02; A01C 1/02; A01C 1/00; A01C 11/025; A01C 11/02; A01C 11/00; A01C 21/005; A01C 21/00; G05B 15/02; G05B 15/00; B65G 1/137; B65G 1/04; B65G 1/02; B65G 1/00
See application file for complete search history.

(56) References Cited

U.S. PATENT DOCUMENTS

| | | | |
|---|---|---|---|
| 6,073,564 | A | 6/2000 | Keskilohko |
| 6,080,951 | A | 6/2000 | Thijssen et al. |
| 7,069,693 | B2 | 7/2006 | Tagawa et al. |
| 2002/0088173 | A1 | 7/2002 | Hessel et al. |
| 2005/0045079 | A1 | 3/2005 | Tagawa et al. |

*Primary Examiner* — Christopher J. Novosad
(74) *Attorney, Agent, or Firm* — Foley & Lardner LLP

(57) ABSTRACT

A germination facility includes a seedling growing system configured to grow a plurality of seedlings; and a seedling sorting device configured to receive spatially variable planting data regarding a planting area for planting the seedlings; receive seedling data regarding the plurality of seedlings; and arrange the plurality of seedlings in a planting container based on the seedling data and on the planting data.

35 Claims, 6 Drawing Sheets

SYSTEMS AND METHODS FOR SORTING SEEDLINGS FOR PLANTING

CROSS-REFERENCE TO RELATED PATENT APPLICATIONS

This application is a divisional of U.S. patent application Ser. No. 14/223,504, titled "SYSTEMS AND METHODS FOR SORTING SEEDLINGS FOR PLANTING," filed Mar. 24, 2014, the entire disclosure of which is incorporated herein by reference in its entirety for any and all purposes.

BACKGROUND

Germination centers or other seedling providers grow seedlings from seeds and supply the seedlings to planting facilities or other planting operations to be planted in a planting area, such as a field or a greenhouse. Growing the seeds into seedlings before planting the seedlings in a planting area allows the plants to gain a "head start" before the growing season begins. For example, the temperature or amount of rain may not yet be adequate to support seed or young seedling growth. Allowing the seeds to first grow in a germination facility provides an adequate environment for at least the first stage of growth into seedlings. After this first stage of growth, the seedlings may then be transplanted into a planting area.

SUMMARY

One embodiment relates to a germination facility, comprising a seedling growing system configured to grow a plurality of seedlings; and a seedling sorting device configured to receive spatially variable planting data regarding a planting area for planting the seedlings; receive seedling data regarding the plurality of seedlings; and arrange the plurality of seedlings in a planting container based on the seedling data and on the planting data.

Another embodiment relates to a method of sorting seedlings, comprising receiving spatially variable planting data regarding a planting area; receiving a plurality of seedlings from a seedling growing system; receiving seedling data regarding the plurality of seedlings; and arranging individual seedlings of the plurality of seedlings in a planting container into an order based on the planting data and the seedling data.

Another embodiment relates to a planting facility, comprising a planting device configured to plant a plurality of seedlings in planting locations located within a planting area; and a planting control system configured to receive spatially variable planting data related to the planting area; receive seedling data regarding the plurality of seedlings; and control operation of the planting device such that the planting locations for individual seedlings of the plurality of seedlings are selected based on the planting data and the seedling data.

Another embodiment relates to a method of planting seedlings, comprising receiving spatially variable planting data related to a planting area; receiving seedling data regarding a plurality of seedlings; receiving the plurality of seedlings; and controlling a planting device such that individual seedlings of the plurality of seedlings are planted in selected planting locations in the planting area based on the planting data and the seedling data.

Another embodiment relates to a growing facility, comprising a seedling growing system configured to grow a plurality of seedlings; a planting device configured to plant the plurality of seedlings into planting locations within a planting area; and a seedling sorting device configured to receive spatially variable planting data regarding the planting area, receive seedling data regarding the plurality of seedlings, and arrange the plurality of seedlings in a planting container in an order based on at least one of the seedling data and the planting data.

Another embodiment relates to a seedling planter, comprising a planting device configured to plant a plurality of seedlings into a planting area; a planting control system supported on the planting device and configured to receive spatially variable planting data related to the planting area; receive seedling data regarding the plurality of seedlings; and control operation of the planting device such that individual seedlings of the plurality of seedlings are planted in planting locations selected based on the planting data and the seedling data.

Another embodiment relates to a method of sorting seedlings, comprising growing a plurality of seedlings; acquiring seedling data regarding the plurality of seedlings; receiving spatially variable planting data regarding a planting area; and arranging the plurality of seedlings in a planting container based on the seedling data and on the planting data.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
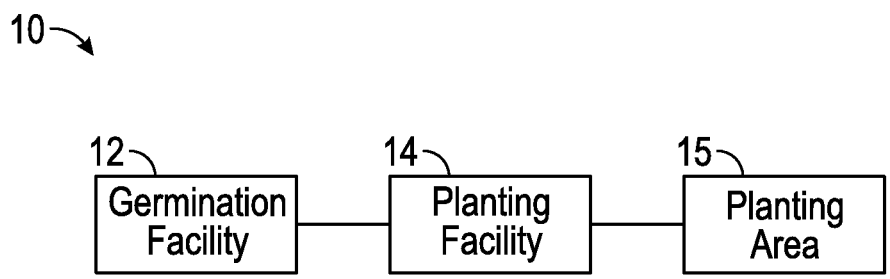
FIG. 1 is a block diagram of a growing system according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Seedlings are often planted in a uniform manner within a planting area without regard to variations in characteristics of individual seedlings, or varying planting and growing conditions between different areas within a planting area. However, seedling characteristics (e.g. age, size, health, type, etc.) may vary considerably between seedlings. Furthermore, planting conditions and growing environments, which can include both soil characteristics (e.g., soil composition, moisture content, nutrient presence, etc.) and environmental factors (e.g., illumination, wind, temperature, etc.), may vary throughout a planting area. Seedlings with certain characteristics may be more or less suitable to different planting conditions and growing environments within the planting area.

As such, various embodiments disclosed herein relate to optimizing plant growth by planting seedlings in desired locations based on one or both of the characteristics of the seedlings and the characteristics of different portions of a planting area. For example, seeds may be grown from seeds to seedlings in a germination facility, and seedling data regarding the seedlings may be acquired. Planting data regarding a planting area may be provided by a planting facility or otherwise acquired from another source. Based on the seedling data and/or the planting data, individual seedlings can be mapped to various planting locations within the planting area and, for example, sorted within a planting container, such that as the seedlings are removed from the container (e.g., in a sequential order as a planting device travels along a planting route), the seedlings are deposited in the desired planting locations. Furthermore, the soil can be locally supplemented with nutrients or other materials (e.g., as seedlings are planted) based on local soil conditions, seedling characteristics, etc., to provide optimal growing conditions.

Referring now to FIG. 1, growing system 10 is shown according to one embodiment, and includes germination facility 12 and planting facility 14. Growing system 10 is configured to grow seedlings and plant the seedlings in planting area 15. Germination facility 12 can grow a wide variety of seedlings. In one embodiment, germination facility 12 provides sorted seedlings to planting facility 14 in containers usable by a planting device. For example, the seedlings may be sorted such that as a planting device that moves through a planting area (e.g., along a predetermined route), seedlings can be removed from the container and planted in a desired location (e.g., a location within the planting area to which the seedling has been mapped based on seedling and/or planting data). Planting area 15 may be any type of location capable of growing seedlings, such as a field, greenhouse, or similar location.

Figure 2:
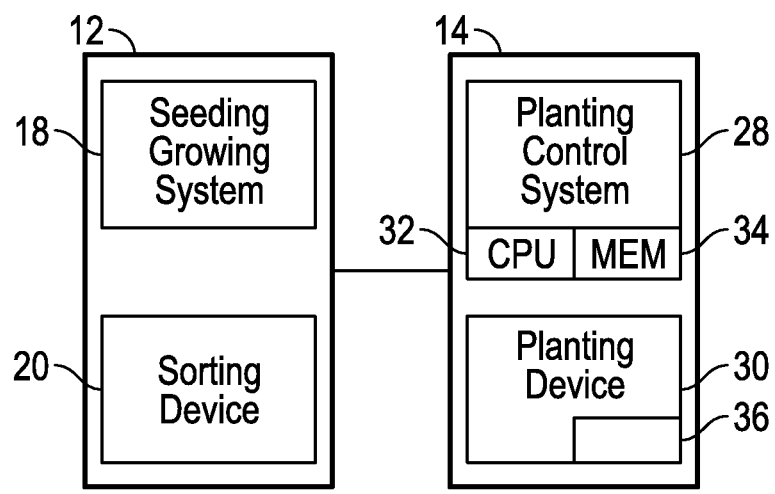
FIG. 2 is a block diagram of the growing system of FIG. 1 shown in greater detail according to one embodiment.
Figure 3:
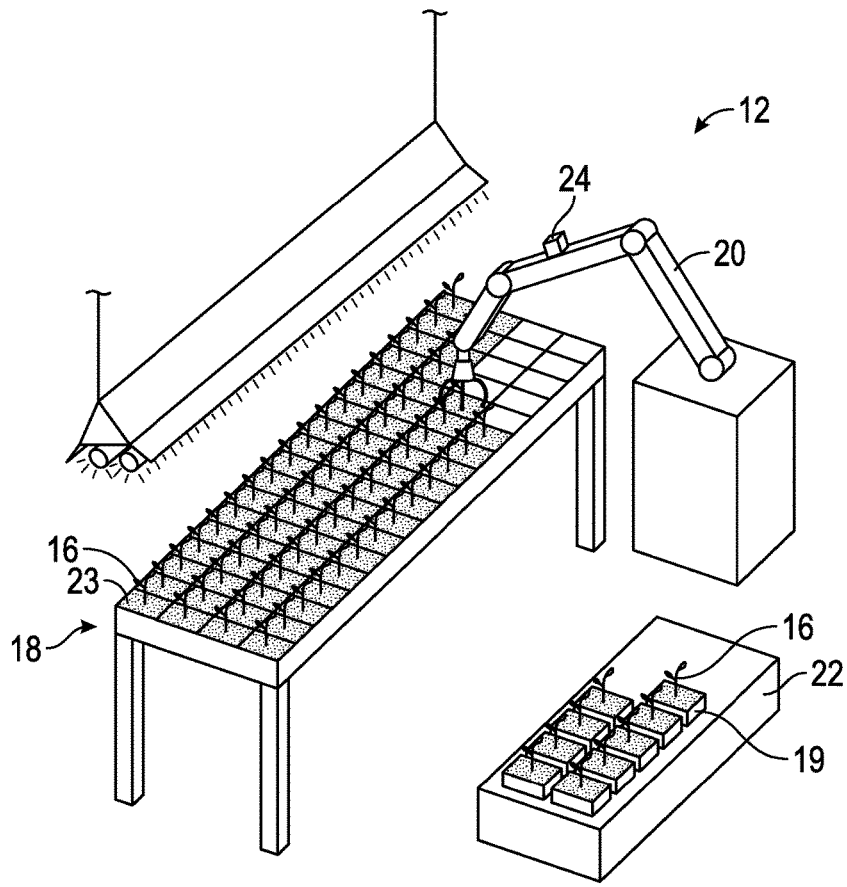
FIG. 3 is a perspective view of a germination facility according to one embodiment.
Figure 4:
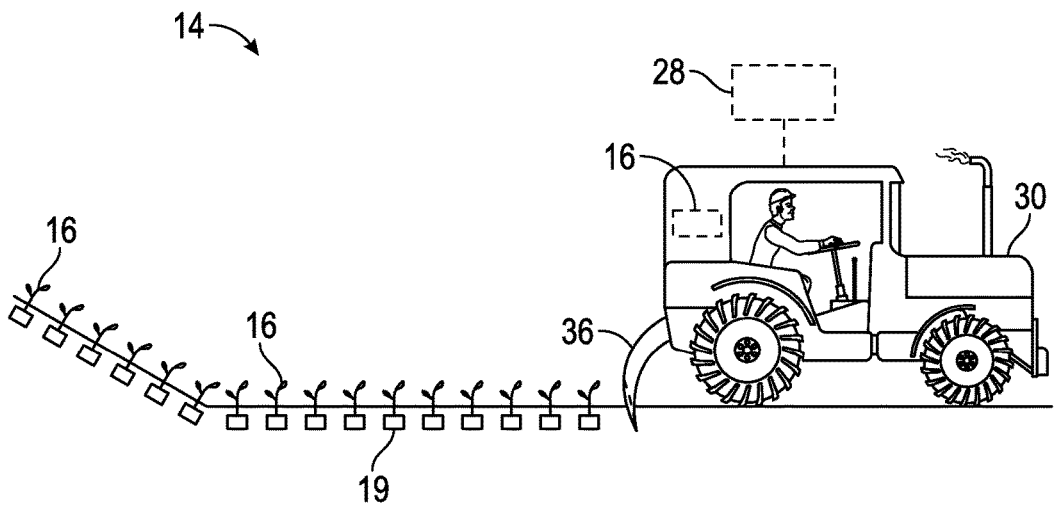
FIG. 4 is a schematic representation of a planting facility according to one embodiment.

Referring to FIGS. 2-4, various components of germination facility 12 and planting facility 14 are shown in greater detail according to one embodiment. As shown in FIG. 2-3, germination facility 12 includes seedling growing system 18 and seedling sorting device 20. Germination facility 12 is configured to germinate and grow a plurality of seeds into seedlings 16 using seedling growing system 18. Seedling sorting device 20 is configured to sort seedlings 16 into containers 22 (see FIG. 3) based on planting data (regarding the planting area for seedlings 16) and/or seedling data (regarding the characteristics of seedlings 16). After sorting, planting container 22 and seedlings 16 may be provided to planting facility 14. Planting facility 14 is configured to transplant seedlings 16 within a planting area such as planting area 15. Various machinery, including an automated planting device, may be used to plant or distribute the seedlings 16 from the planting container 22 into the planting area 15 within a planting facility.

Referring to FIG. 3, germination facility 12 may utilize a variety of technologies to grow seeds into seedlings 16. For example, a hydroponic system may be used to grow the seeds, in which water and mineral nutrient solutions are used at least partially in place of soil. Physical supports, like soil, sticks, a lattice, or granules, may also be used to germinate or support the seeds or seedlings. For example, granules 23 can be used to help physically support seedlings 16.

As part of the growing and/or transplanting processes, seedling sorting device 20 or another suitable device may pack or preload individual seedlings 16 with a corresponding customized package 19 into planting container 22. Customized package 19 may be transplanted or co-delivered with seedlings 16 into a planting location in the planting area. Alternatively, a planting device (see, e.g., FIG. 4) may add customized package 19 directly to seedlings 16 or directly to each planting location as seedlings 16 are planted. In further embodiments, seedling growing system 18 may add customized package 19 while or before seedlings 16 are grown from seeds.

Package 19 can be configured based on planting data and/or seedling data. For example, package 19 may include additives and/or soil to help supplement the planting location of individual seedling 16, or to provide supplements according to the specific needs of seedlings 16. Package 19 can be configured to locally optimize or tailor planting locations to the individual seedling 16, or supplement a certain area of a planting area where nutrients may be lacking. Package 19 may be individualized or generalized according to either the specific or general needs of seedlings 16 or the planting locations, and may be configured based on various types of data, including seedling data and/or planting data. Package 19 may include a customized soil, nitrogen, potassium, phosphorus, iron, pH-adjusting buffering agents, microorganisms, supplements, additives (e.g., according to soil type), nutrients, micronutrients, chemicals, microbes, water-retention particles, prebiotics, probacteria, bacteria, fertilizers, and/or additives to provide a customized moisture level or content.

In one embodiment, to meet the nutrient requirements of seedlings 16 during different stages of growth, package 19 may be configured with time-optimized or time-released features, such as chemical fertilizers with various time-release profiles. For example, nitrogen is required by plants in later stages of growth, but may easily wash away with rain or irrigation, and may cause bacterial decomposition into volatiles. Therefore, two forms of nitrogen may be added to customized package 19, to provide nitrogen during the appropriate stages when nitrogen is required (i.e., early in development and just before pollination).

During or after the growing process, the seedlings can be sorted into containers. In one embodiment, sorting device 20 is configured to capture seedling data (e.g., by way of one or more data acquisition devices such as a sensor 24) regarding seedlings 16. Sensor 24 can include any type of sensor, including a camera, imaging device, temperature sensor, etc. Alternatively, seedling sorting device 20 can receive seedling data from another source (e.g., a data acquisition device, an operator, etc.). Sorting device 20 can also receive spatially variable planting data regarding variations in soil or environmental conditions within a planting area. Based on one or both of the seedling data and the planting data, sorting device 20 sorts seedlings 16 into container 22 (e.g., by size, type, age, etc.).

Seedling data can include a variety of seedling characteristics such as health, size, height, age, type, water tolerance, or genetics. Seedling data may include information about the canopy radius of seedlings 16. Alternatively, seedling data may include individual and/or group information regarding seedlings 16.

Planting data can include various characteristics of growing conditions for different portions of a planting area, such as local, preexisting soil characteristics or conditions and/or environmental factors. For example, planting data may include a variety of soil characteristics, such as soil type, moisture/water content, amount or type of water-retention materials, soil composition, pH level, amount of drainage, soil micronutrient presence, and nutrient presence or deficiencies. Planting data may indicate the presence or absence of pH-adjusters or chemical and/or fertilizer nutrients, such as nitrogen, potassium, phosphorus, or iron.

Planting data may also provide indications of environmental differences or factors within a planting area, such as illumination, wind, and temperature. More specifically, the edges of a planting area (e.g., in the case of a greenhouse) may have different amounts of illumination, wind exposure, and temperature than the interior of a planting area. Planting data may also include an indication of the presence of pests, pesticides, parasites, microbiological agents, weeds, weed-seeds, root-active herbicides, and anticipated growing conditions. Anticipated growing conditions may include anticipated rainfall, planned irrigation, planned pest and weed suppression, and forecasted temperatures and humidity.

Planting data may be measured, evaluated, or analyzed in advance and/or while seedlings 16 are being planted (e.g. with a real-time assay). In some embodiments, multi-spectral microwave-probing of soil may be used to determine the water content relative to the exact location within a planting area (including the location of the water beneath the soil). Planting data may be acquired using an electronic positioning system, such as a global positioning system (GPS), an inertial navigation system, a local positioning system (e.g., operative within the planting area). For example, a map (e.g., a two-dimensional map) may be generated that includes various planting data for various planting locations. The map can then be accessed during the planting process. Planting data may correspond to conditions along the planned route of a planting device within the planting area. This route dependent planting data may be generated by traversing the route with one or more sensing devices and measuring the conditions along the route. For example, certain aspects or conditions, such as the soil and/or environmental conditions, may be assayed along the planned route and incorporated into the planting data. Alternatively, route dependent planting data may be generated by reorganizing mapped planting data to correspond to locations along the route.

In one embodiment, sorting device 20 can sort seedlings based on only seedling data (e.g., to group similar seedlings together, to order seedlings based on one or more characteristics, etc.). In another embodiment, sorting device 20 can sort seedlings 16 further based on planting data (e.g., to correlate seedlings to appropriate growing areas that provide an optimal match between the seedling data and the planting data, to sort seedlings based on a known or expected route of a planting device, etc.). Seedlings 16 may be arranged in a linear sequence to correspond to a planned route of the planting device 30. In some embodiments, seedlings 16 may be assigned identifiers (e.g., barcodes, machine readable text, color coding, etc.) that encode or link to information (e.g., coordinates of a planting location, or soil or environmental conditions) related to recommended planting locations for the seedling 16 within the planting area 15. In such embodiments, the seedlings 16 may not be physically arranged in a linear sequence, but can be located within a planting container 22 based on their identifier and planted in the recommended location. The seedling data may include at least one of the identifiers and/or planting information. In other embodiments, seedlings 16 may be sorted by seedling sorting device 20 according to their genetic matching to planting data. In further embodiments, seedlings can be sorted based on other factors (e.g., user inputs providing a desired planting pattern within a planting area, expected weather conditions received from a user, remote source, etc., or other factors). The planting control system 40 may be configured to specify a loading configuration for the seedlings 16 within the planting device 30 based on the linear sequence. The seedlings 16 may additionally be arranged within the planting device 30 according to the loading configuration.

In some embodiments, different types or varieties of seedlings 16 may be used within planting area 15. For example, seedlings 16 may include two varieties of seedlings that are genetically different and therefore comprise different seedling data. Seedling data of the different varieties of seedlings 16 may be optimally correlated to planting data (e.g., by way of genetic matching). Further, seedlings 16 may include different varieties of seedlings 16 that have different canopy radii. The planting locations of seedlings 16 along planting area 15 may be optimized to maximize the available space within planting area 15 according to the canopy radii of the seedling or the grown plant.

The seedlings can be sorted in a variety of ways and according to various factors. In one embodiment, seedlings 16 are sorted according to characteristics of the seedlings, such as age, size, health, type, and so on. In some embodiments, seedlings 16 are automatically sorted or organized into a sequential order according to a desired correlation of seedlings 16 to a particular planting location. Seedlings 16 may be further organized or arranged according to a planned planting route or pattern of planting device along planting area 15. Preloaded information, such as a predetermined protocol and/or a model of plant growth and/or crop yield, may be used by seedling sorting device 20 to determine optimal planting locations for each individual seedling 16, correlate planting data and seedling data, and/or automatically arrange individual seedlings 16. Germination facility 12 may additionally provide a scoring of seedlings 16 (e.g., based on age, health, size, etc.) to aid in the organization or sorting of seedlings 16.

Correlating planting data and seedling data may enhance germination and plant development (e.g. root development, penetration to the soil-top, and pest and herbivore resistance and repelling). This correlation may also maximize crop value. For example, weaker seedlings 16 may have access to better growing conditions. The ages of individual seedlings 16 may be correlated with local soil parameters to allow most or all of seedlings 16 to mature at the same time despite local soil or environmental differences.

Planting container 22 may be any type of vessel, such as a cartridge or cassette, configured to receive, hold, or transport seedlings 16. Planting container 22 may maintain a particular order or sequence of seedlings 16 as they are moved or planted along a planting area. Planting container 22 may have multiple different configurations. For example, planting container 22 may include multiple containers with seedlings 16. Alternatively or additionally, planting container 22 may include data (e.g., stored in a memory device)

to instruct a planting device where to plant each individual seedling 16 within the planting area or what planting route to take. For example, the data may indicate to the planting device to plant individual seedling 16 in a region within planting area 15 with a particular soil composition or amount of exposure to illumination. Alternatively, the data may indicate a planting route (e.g., in order to correspond with a pre-arranged order of seedlings 16); the route can be indicated by a sequence of driving instructions, by a path on a map, by an identifier or pointer to a stored route, etc.

Referring to FIGS. 2 and 4, after being grown at germination facility 12 or a similar facility, seedlings 16 may be provided to planting facility 14 (e.g., a planting system, etc.) and transplanted within planting area 15 (e.g., by a planting device). Planting facility 14 includes planting control system 28 and planting device 30. In one embodiment, planting control system 28 can be incorporated into planting device 30 (e.g., as part of an integrated planting device). In other embodiments, planting control system 28 is a separate component from planting device 30. Planting device 30 is configured to plant seedlings 16 in planting locations within planting area 15 (as shown in FIG. 4). In some embodiments planting device 30 may be automated or robotically controlled. In one embodiment, planting device 30 is configured to travel along a predetermined route previously provided to a germination facility, such as germination facility 12, such that seedlings 16 can be removed from a container such as container 22 in a generally sequential manner and deposited in planting locations along the travel route.

Planting control system 28 is in one embodiment configured to provide control signals to planting device 30 to control operation of planting device 30 (e.g., along a route through the planting area) and/or to control the planting of seedlings (e.g., to identify which seedlings should be planted in various locations within the planting area). In one embodiment, planting control system 28 includes processor 32 and memory 34. Processor 32 may be implemented as a general-purpose processor, an application specific integrated circuit (ASIC), one or more field programmable gate arrays (FPGAs), a digital-signal-processor (DSP), a group of processing components, or other suitable electronic processing components. Memory 34 is one or more devices (e.g., RAM, ROM, Flash Memory, hard disk storage, etc.) for storing data and/or computer code for facilitating the various processes described herein. Memory 34 may be or include non-transient volatile memory or non-volatile memory. Memory 34 may include database components, object code components, script components, or any other type of information structure for supporting the various activities and information structures described herein. Memory 34 may be communicably connected to processor 32 and provide computer code or instructions to processor 32 for executing the processes described herein.

Planting control system 28 can be configured to provide various planting patterns for a planting device. For example, different varieties of seedlings 16 may be planted within planting area 15. Varieties of seedlings 16 with different canopy radii may be planted adjacent each other to maximize available space within planting area 15. Alternatively or additionally, genetically different variants of seedlings 16 may be planted within planting area 15. In some embodiments, the planting locations are chosen according to an optimized correlation between seedling data and planting data to provide the optimal growing environments for each seedling 16. As shown, in FIG. 4, different areas of planting area 15 have seedlings 16 with different heights. FIG. 4 depicts taller seedlings planted along a sloped section of planting area 15, and shorter seedlings planted along a flat section of planting area 15. Alternatively, seedlings 16 may be correlated to planting area 15 according to additional or alternative seedling data and/or planting data.

According to one embodiment, planting device 30 includes planting mechanism 36 to plant seedlings 16 in desired locations. For example, planting mechanism 36 may be or use robotic hands to insure the proper spacing of seedlings 16 relative to each other. For example, a one dimensional fiber (e.g., to provide spacing for a single row of seedlings) or a two dimensional sheet (e.g., to provide spacing for multiple rows of seedlings) may be used to ensure the proper spacing between seedlings 16. Robotic hands may be programmed to separate seedlings 16 according to a programmed spacing. Alternatively, the fabric may physically separate each seedling 16 according to a proper spacing. In one embodiment, planting control system 28 is configured to control planting mechanism 36 or other components of device 30 either locally (e.g., on a moving planting device) or remotely (e.g., via wireless communications). Planting device 30 may be a tractor or similar vehicle with a planting mechanism, a cart on wheels with a robotic arm (e.g., to be pulled by a separate vehicle), or any type of device capable of transplanting seedlings 16 about planting area 15.

It should be understood that in some embodiments, growing system 10 is provided as an integrated growing system at a single location. In other embodiments, germination facility 12, planting facility 14, and/or planting area 15 can be remotely located from each other. All such embodiments are within the scope of the present disclosure. Furthermore, while as shown in FIGS. 2-4, germination facility 12 is configured to sort seedlings that are then provided to planting facility 14, according to other embodiments, planting facility 14 can provide seedling sorting capabilities (e.g., in the case where seedlings are provided unsorted).

Figure 5:
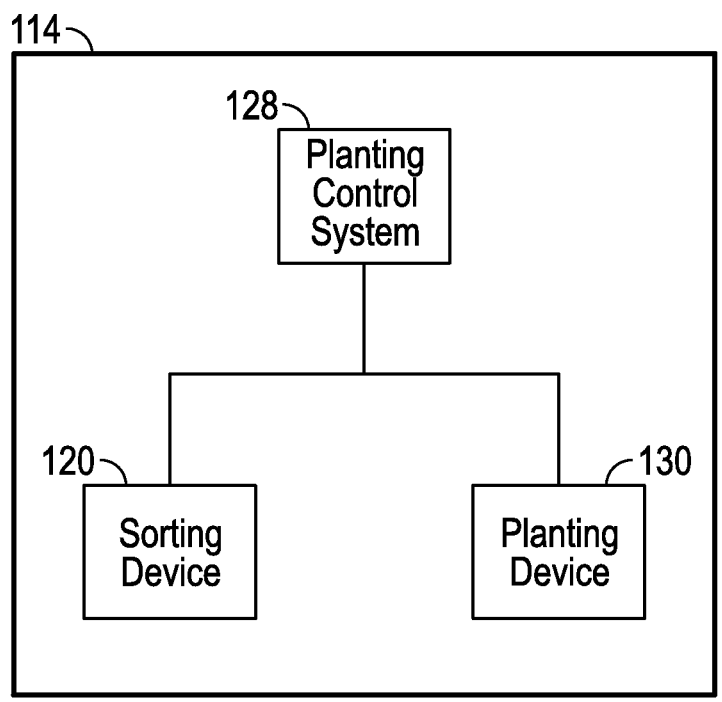
FIG. 5 is a block diagram of a planting facility according to another embodiment.
Figure 6:
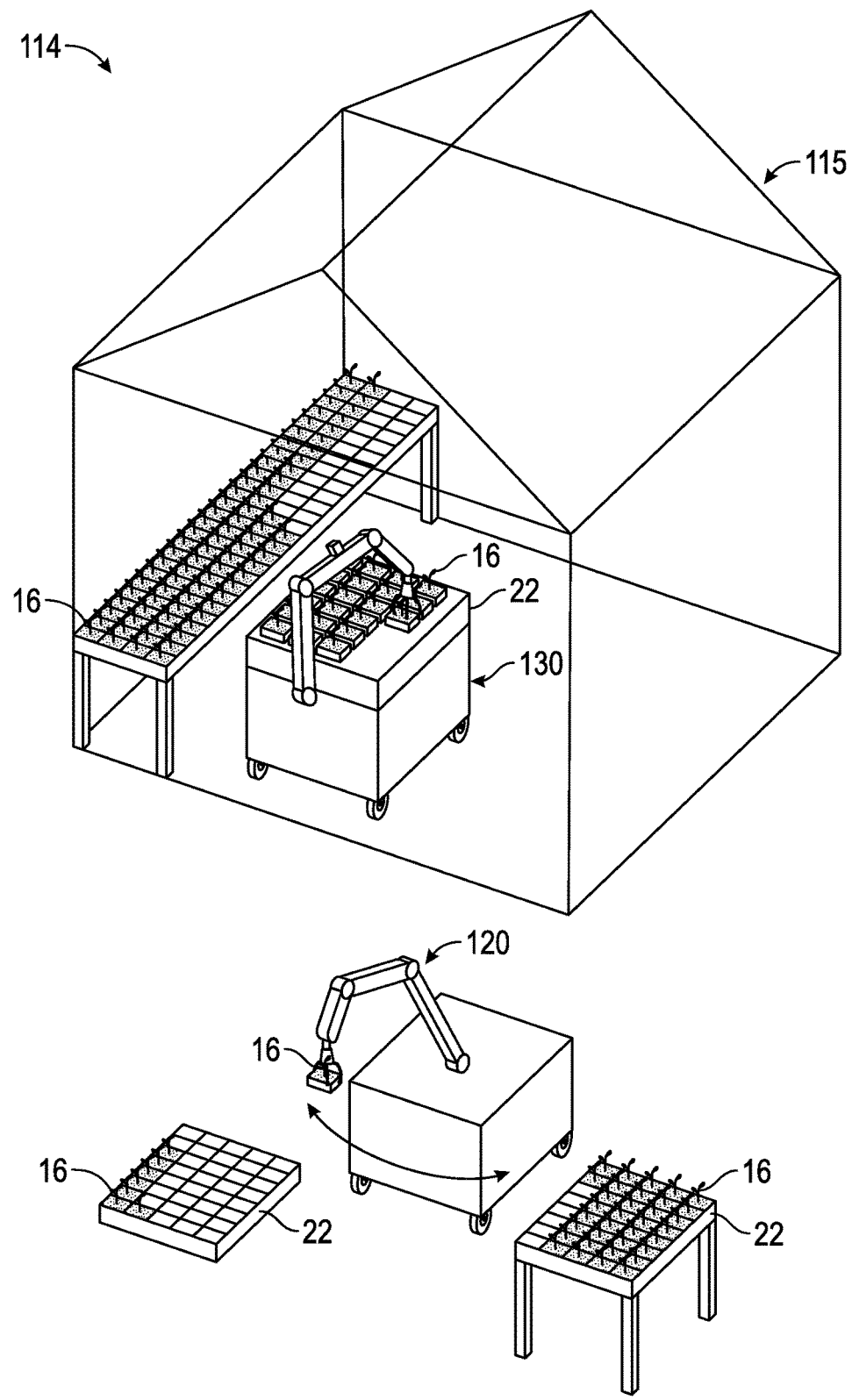
FIG. 6 is a schematic representation of the planting facility of FIG. 6 according to one embodiment.

For example, referring to FIGS. 5-6, planting facility 114 is shown according to one embodiment and includes planting control system 128, sorting device 120, and planting device 130. Planting control system 128 can be configured to control operation of one or both of sorting device 120 and planting device 130. Sorting device 120 can include any of the features of sorting device 20 and perform any of the functions of sorting device 20. For example, as shown in FIG. 6, sorting device 120 sort seedlings 16 from a first container 22 to a second container 22 based on seedling and/or planting data. Planting device 130 can than plant seedlings 16 within planting area 115, shown in FIG. 6 as a greenhouse. It should be understood that the various devices and components shown in FIGS. 5-6 can be similar in structure and function to those components shown in other embodiments disclosed herein.

Referring further to FIGS. 5-6, in one embodiment, planting control system 128 is configured to receive planting data related to planting area 115 and/or seedling data related to seedlings 16. Based on the planting data and seedling data, planting control system 128 may control the operation of planting mechanism 136 to select and plant individual seedlings in particular planting locations within planting area 115 according to a desired correlation of the planting data and seedling data. Alternatively or additionally, planting control system 128 may control the route of planting device 130 to optimally correlate the planting locations with seedlings 16. As discussed above, various properties of the soil/planting area can be adjusted (e.g., modulated) as the planting device moves about the planting area (e.g., by providing customized packages 19 or other additives, etc.)

Figure 7:
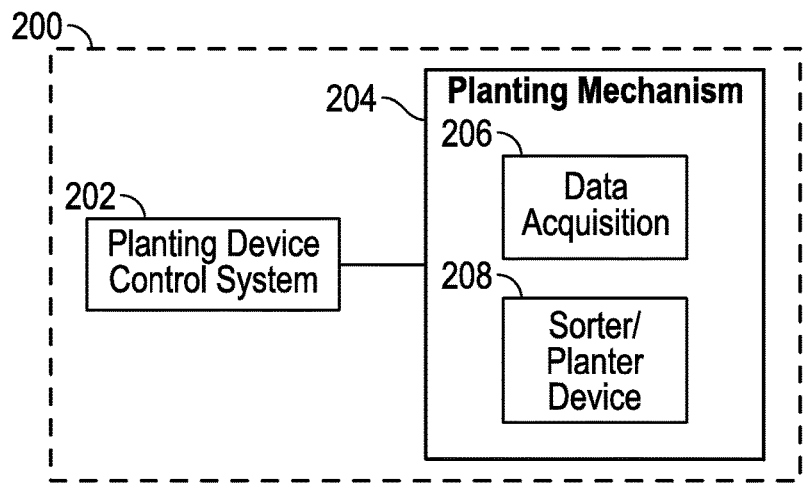
FIG. 7 is a block diagram of a seedling planter according to one embodiment.
Figure 8:
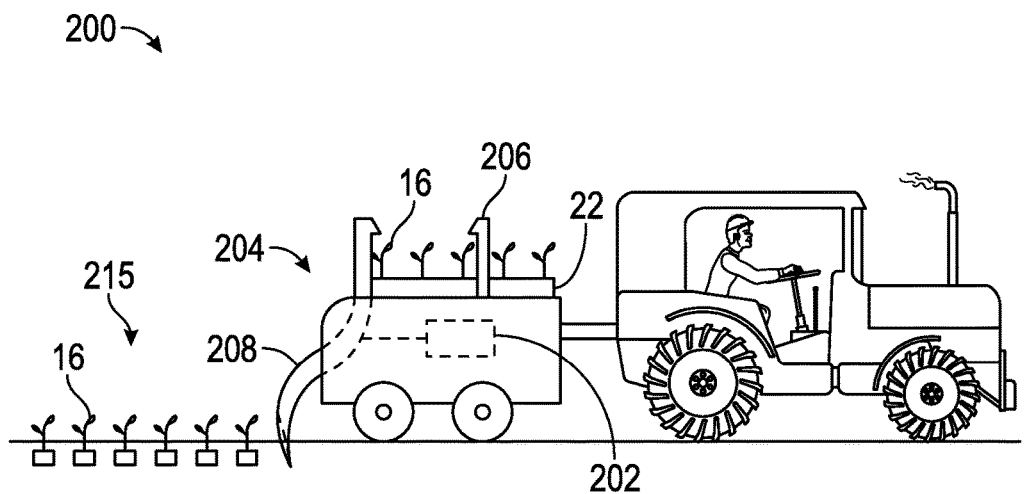
FIG. 8 is a schematic representation of the seedling planter of FIG. 7 according to one embodiment.

In some embodiments, seedling sorting features can be integrated into a planting device such as a mobile seedling planter. Referring to FIGS. 7-8, seedling planter 200 is shown according to one embodiment. Seedling planter 200 can be configured to sort or organize seedlings 16 while travelling within planting area 215. Planter 200 is configured to carry seedlings 16 within a container such as planting container 22. Planter 200 includes a planter control system or device 202 and a planting mechanism 204. Planting mechanism 204 includes data acquisition device 206 and planting device 208. Data acquisition device 206 is configured to acquire seedling data regarding seedlings 16 and/or planting data regarding planting area 215. Device 206 provides the acquired data to planter control device 202. Planting device 208 is configured to plant seedlings 16 within planting area 215. Planter control device 202 is configured to control operation of planting device 208 based on the seedling data and/or planting data regarding planting area 215. For example, control device 202 can direct planting device 208 to select seedlings based on planting data (e.g., a current location of planter 500, local growing conditions, etc.) and seedling data (e.g., characteristics of one or more seedlings).

In some embodiments, data acquisition device 206 includes a sensor, camera, etc. configured to acquire various types of data regarding seedlings 16 and/or a local planting area, and provide the data to planter control device 202. Data acquisition device 206 can be configured to acquire data regarding the local growing conditions within the planting area (e.g., presence of weeds or pests, deficiencies in soil composition, water content, etc.). In other embodiments, planter control device 202 is configured to receive seedling data and/or planting data from a remote source (e.g., a germination facility, etc.). In some embodiments, planting control system 202 organizes and sorts seedlings 16 according to the planting data and seedling data. Planting control system 202 may alternatively or additionally decide which seedling 16 to plant in the current location of planting device 208 according to the optimal correlation between seedlings 16 and a current location within planting area 215, and select appropriate seedlings 16 accordingly (e.g., without sorting seedlings 16). FIG. 8 depicts seedlings 16 being planted into soil 216 of planting area 215 (e.g., a field, etc.). Alternatively, planting area 215 may be a greenhouse or other suitable planting area. In some embodiments, control system 202 can identify one or more additives to be provided to a particular planting location based on seedling and/or planting data (e.g., to "modulate" local soil conditions).

It should be understood that according to any of the embodiments disclosed herein, seedlings can be sorted within containers and/or selected for planting in particular planting areas based on a wide variety of data, including various types of seedling data, planting data, etc. For example, seedling data can include characteristics such as health, size, height, age, type, canopy radius, water tolerance, sun tolerance, various genetic data, etc. Various types of data (e.g., seedling data regarding seedlings, planting data regarding local growing conditions within a planting area, etc.) can be acquired and stored in memory in advance of a growing and/or planting operation, or alternatively, can be acquired and used in a real-time or near real time manner (e.g., during a growing or planting operation) to provide the location-specific sorting and planting features disclosed herein.

Figure 9:
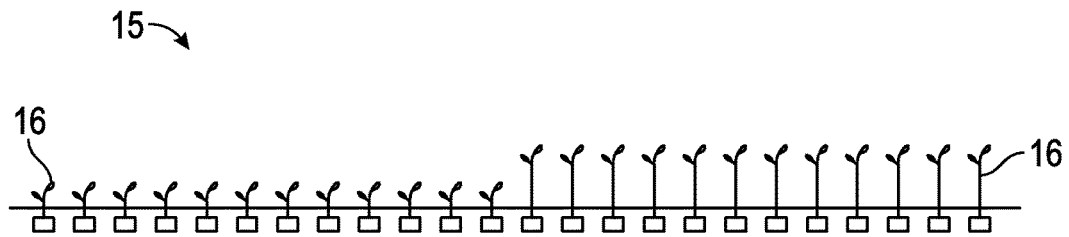
FIG. 9 is cross-sectional view of seedlings planted in soil according to one embodiment.

Referring to FIG. 9, a cross-section of an agricultural growing operation is shown. Optimal seedling placement varies with location along the planting area according to seedling data, such as seedling characteristics, and planting data, such as planting area characteristics. According to one embodiment, seedling data and planting data are correlated according to certain criteria or a desired correlation, and seedlings 16 are transplanted in particular planting locations within planting area 15, thereby obtaining "precision planting" and optimizing plant growth and/or crop yield. As shown in FIG. 9, seedlings 16 with different heights have been planted in different areas along planting area 15, according to seedling data and/or planting data. The seedlings can be mapped to various planting locations based on any of the factors discussed, herein, including seedling and/or planting data.

Figure 10:
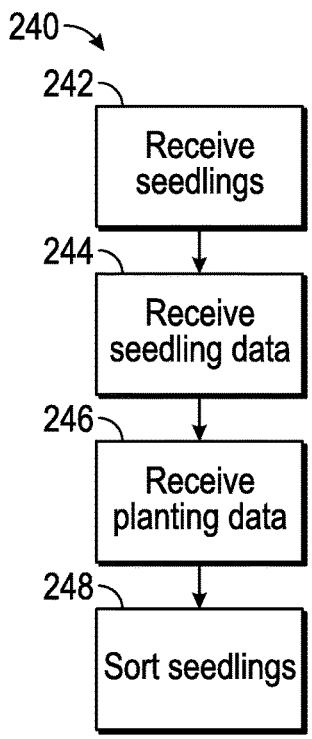
FIG. 10 is a flow diagram of a method of sorting seedlings according to another embodiment.

Referring now to FIG. 10, method 240 of providing sorted seedlings is shown according to one embodiment. Seedlings are received (242). In one embodiment, a third-party sorting facility may receive the seedlings from a germination facility or a seedling growing device. Seedling data is received (244). The third-party sorting facility may receive seedling data from the germination facility regarding seedlings. Alternatively or additionally, a third-party sorting facility can analyze the seedlings to obtain seedling data. Planting data is received (246). The third-party sorting facility may receive planting data from the planting facility, regarding the characteristics of a planting area. The seedlings are sorted based on the seedling and/or planting data (248). The third-party sorting facility may subsequently sort the seedlings into a planting container according to the desired correlation between seedling data and planting data. The planting container may then be transported to a planting area for the seedlings to be planted within.

Figure 11:
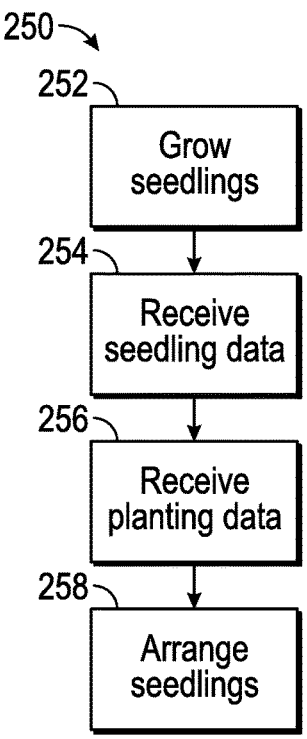
FIG. 11 is a flow diagram of a method of growing and sorting seedlings according to another embodiment.

Referring to FIG. 11, method 250 of sorting seedlings is shown according to one embodiment. Method 250 may be conducted by a germination facility configured to grow seedlings. The seedlings are grown (252). The germination facility may germinate and/or grow seedlings using a variety of different devices, such as a seedling growing system. The seedling data is received (254). The germination facility may obtain or receive seedling data regarding the characteristics of the seedlings through a variety of different methods, such as seedling analysis. The planting data is received (256). The germination facility may also receive planting data regarding the characteristics of a planting area for planting the seedlings. The planting data may include a map of the planting area with a planned route of a planting device. The planting area may be analyzed by a planting facility or a third-party and sent to the germination facility. The seedlings are sorted (258). With the seedlings, the seedling data, and the planting data, the germination facility may arrange the seedlings into a planting container based on the planting data and the seedling data. The planting container may be used to transport, hold, and/or plant the seedlings.

Figure 12:
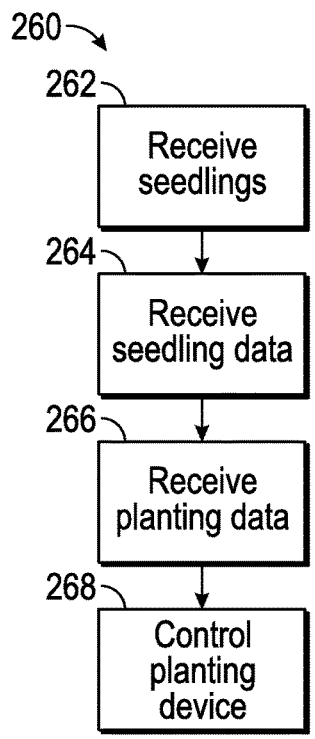
FIG. 12 is a flow diagram of a method of sorting and planting seedlings according to another embodiment.

Referring to FIG. 12, method 260 of planting seedlings is shown according to one embodiment. Method 260 may be conducted by a planting facility configured to plant seedlings. Seedlings are received (262). The planting facility may receive seedlings from a germination facility or a seedling growing system. Seedling data is received (264). The planting facility may further receive seedling data from the germination facility or the seedling growing system. Alternatively or additionally, the planting facility may analyze the seedlings to obtain the seedling data. Planting data is received (266). The planting facility may receive planting data related to a planting area to plant the seedlings. The planting facility may use a third-party to obtain the planting data or may perform the planting area analysis. The planting facility may provide the planting data to the germination facility or to a third-party sorting facility from which it receives the seedlings. A planting device is controlled to plant the seedlings (268). The planting facility may control a planting device configured to plant seedlings, such that the planting location within the planting area for the seedlings are selected based on the planting data and the seedling data. For example, the planting facility may correlate and optimize the planting data and the seedling data to determine which each planting location for each seedling. This optimization may be performed before or while the planting device is planting the seedlings along the planting area. The planting facility may plant the seedlings according to the planting locations within the planting area with the planting device.

Each of the components of the different embodiments discussed herein may be analogous to other components of other embodiments, and therefore include at least the listed features, benefits, modifications, and variations of the analogous components. Additionally, the seedling sorting devices and planting control systems may be analogous depending on the desired arrangement. Additionally, each of the components may be used with or without the other analogous components within other embodiments.

While the present disclosure is directed to seedlings, which may be a young plant grown from seed, in alternate embodiments, the present systems and methods could be applicable to seeds, before the seed has grown into a seedling. For example, the seeds could be sorted according to their genetic makeup and placed in an optimized location along the planting area. Additionally, the seedlings disclosed may be chosen from a larger group of seedlings, according to the desired seedling data.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A planting facility, comprising:
   a planting device configured to plant a plurality of seedlings in planting locations located within a planting area; and
   a planting control system configured to:
   receive spatially variable planting data related to the planting area;
   receive seedling data regarding the plurality of seedlings; and
   control operation of the planting device such that the planting locations for individual seedlings of the plurality of seedlings are selected based on the planting data and the seedling data.

2. The planting facility of claim 1, wherein the planting data includes information regarding soil for a plurality of areas within the planting area.

3. The planting facility of claim 2, wherein the planting data includes information regarding at least one of moisture content, water retention materials, and drainage conditions for a plurality of areas within the planting area.

4. The planting facility of claim 2, wherein the planting data includes information regarding at least one of pH levels and micronutrient levels for a plurality of areas within the planting area.

5. The planting facility of claim 1, wherein the planting data includes information regarding environmental conditions for different areas within the planting area.

6. The planting facility of claim 1, wherein the planting data includes a two-dimensional map of the planting area, wherein the two-dimensional map includes a planned route of the planting device within the planting area, wherein the planting locations are along the planned route.

7. The planting facility of claim 6, wherein the planting control system is configured to specify a loading configuration for the seedlings within the planting device based on the linear sequence.

8. The planting facility of claim 6, wherein the planting data is acquired by assaying of soil along the planned route.

9. The planting facility of claim 1, wherein the planting data corresponds to conditions along a planned route of the planting device within the planting area.

10. The planting facility of claim 1, wherein the planting locations are along a planned route of the planting device within the planting area, wherein individual seedlings are transplanted sequentially and automatically in the planting locations along the planned route.

11. The planting facility of claim 1, wherein the planting data is acquired by real-time assaying of soil within the planting area.

12. The planting facility of claim 1, wherein the planting control system determines the planting locations and uses a model of at least one of plant growth and crop yield to correlate the planting data and the seedling data.

13. The planting facility of claim 1, wherein the planting data is determined by multi-spectral microwave-probing of soil within the planting area.

14. The planting facility of claim 1, wherein the planting data is determined by use of an electronic positioning system.

15. The planting facility of claim 1, wherein the seedling data includes at least one of an age, a health, and a size of the individual seedlings.

16. The planting facility of claim 1, wherein the plurality of seedlings includes a first variety of seedlings and a second variety of seedlings.

17. The planting facility of claim 16, wherein the second variety of seedlings is a genetically different variant of the first variety of seedlings, wherein the seedling data for the first variety of seedlings and the second variety of seedlings are correlated to the planting data according to genetic matching.

18. The planting facility of claim 1, wherein the planting device is configured to receive a planting container including the plurality of seedlings.

19. The planting facility of claim 18, wherein the plurality of seedlings within the planting container are presorted and preloaded according to the seedling data, the planting data, and a planned route of the planting device.

20. The planting facility of claim 18, further comprising a seedling sorting device configured to arrange individual seedlings in the planting container.

21. The planting facility of claim 18, wherein the seedling sorting device arranges the individual seedlings according to a planned route of the planting device.

22. The planting facility of claim 1, wherein the individual seedlings are matched with a corresponding customized package according to at least one of the seedling data and the planting data.

23. The planting facility of claim 1, wherein the planting device is robotically controlled.

24. A method of planting seedlings, comprising:
    receiving spatially variable planting data related to a planting area;
    receiving seedling data regarding a plurality of seedlings;
    receiving the plurality of seedlings;
    controlling a planting device such that individual seedlings of the plurality of seedlings are planted in selected planting locations in the planting area based on the planting data and the seedling data.

25. The method of claim 24, further comprising providing the planting data to at least one of a germination facility and a third-party sorting facility.

26. The method of claim 24, further comprising transplanting the plurality of seedlings sequentially and automatically in the planting locations along a planned route of the planting device within the planting area.

27. The method of claim 24, further comprising using a model of at least one of plant growth and crop yield to determine planting locations of the plurality of seedlings.

28. The method of claim 24, wherein the seedling data includes at least one of an age, a health, and a size of the individual seedlings.

29. The method of claim 24, wherein the seedling data comprises information related to a recommended planting location for the seedling within the planting area.

30. A seedling planter, comprising:
    a planting device configured to plant a plurality of seedlings into a planting area;
    a planting control system supported on the planting device and configured to:
    receive spatially variable planting data related to the planting area;
    receive seedling data regarding the plurality of seedlings; and
    control operation of the planting device such that individual seedlings of the plurality of seedlings are planted in planting locations selected based on the planting data and the seedling data.

31. The seedling planter of claim 30, wherein the planting data includes information regarding environmental conditions for different areas within the planting area.

32. The seedling planter of claim 30, wherein the planting data includes a two-dimensional map indicative of the growing conditions within the planting area, wherein the map includes a planned route of the planting device within the planting area, wherein the planting locations are along the planned route.

33. The seedling planter of claim 30, wherein the individual seedling for each planting location is automatically selected and transplanted as the planting device moves about the planting area.

34. The seedling planter of claim 30, wherein the planting control system uses a model of at least one of plant growth and crop yield to determine the planting locations.

35. The seedling planter of claim 30, wherein the plurality of seedlings within the planting container are presorted and preloaded according to the seedling data, the planting data, and a planned route of the planting device within the planting area.

* * * * *